(No Model.)
B. MATTRESS.
STUMP EXTRACTOR.
No. 493,593. Patented Mar. 14, 1893.
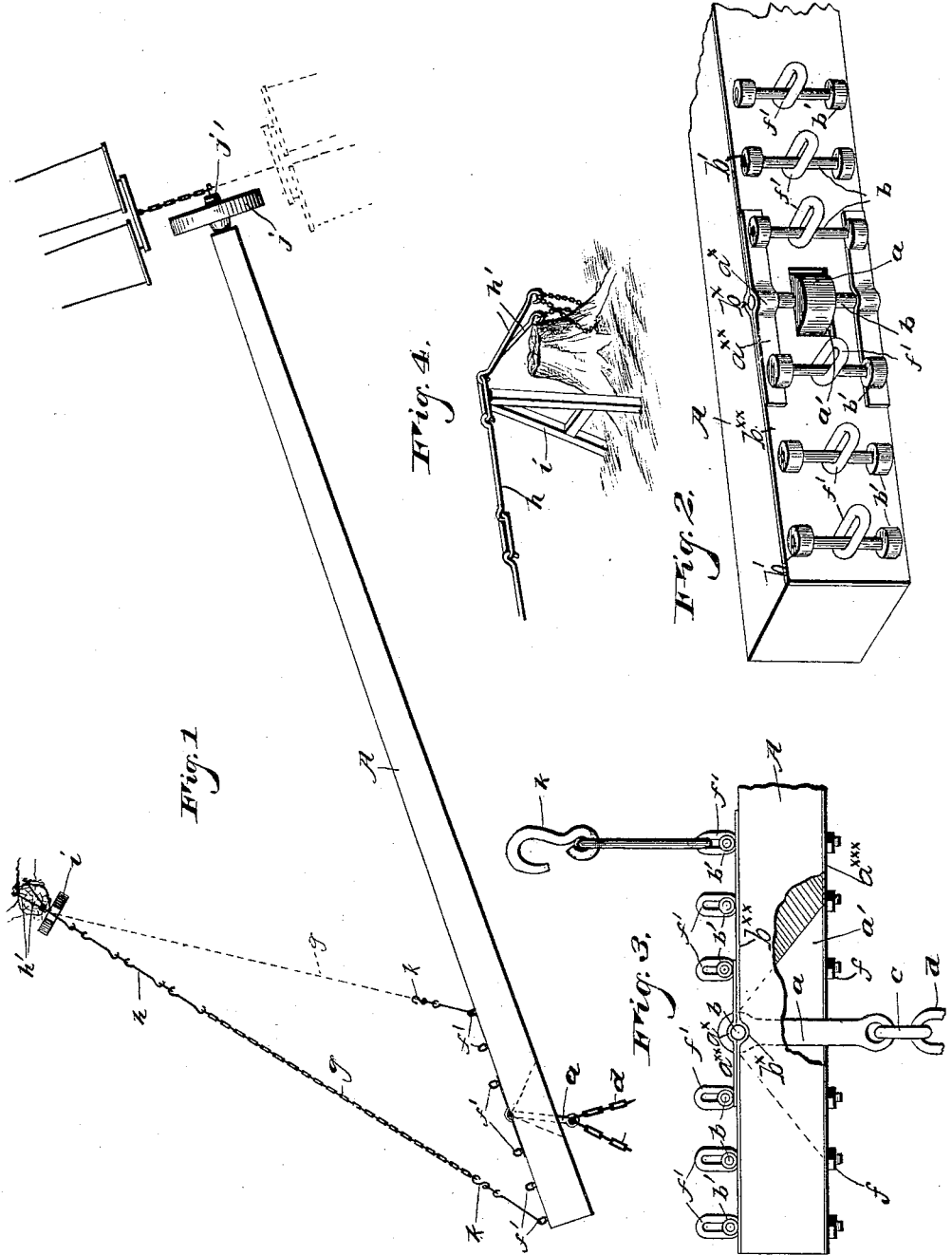
WITNESSES:
Samuel Ker.
Joef A. Hagomann
INVENTOR
Benjamin Mattress
BY Myers & Co
ATTORNEYS

UNITED STATES PATENT OFFICE.

BENJAMIN MATTRESS, OF SCRIBNER, CALIFORNIA.

STUMP-EXTRACTOR.

SPECIFICATION forming part of Letters Patent No. 493,593, dated March 14, 1893.

Application filed December 29, 1890. Renewed January 21, 1893. Serial No. 459,201. (No model.)

*To all whom it may concern:*

Be it known that I, BENJAMIN MATTRESS, a citizen of the United States of America, residing at Scribner, in the county of Humboldt and State of California, have invented certain new and useful Improvements in Stump-Extractors, of which the following is a specification, reference being had therein to the accompanying drawings.

My invention relates to certain improvements in stump extractors and it consists in the detailed construction and combination of parts as hereinafter disclosed.

In the accompanying drawings—Figure 1 is a plan view of my improved stump extractor the dotted lines indicating the application of the draft in the opposite direction, *i. e.*, the team traveling away from the stump. Fig. 2 is an enlarged detailed, perspective view thereof, parts being broken away. Fig. 3 is an enlarged detailed view of the same parts being broken away and in section. Fig. 4 is an enlarged detailed plan view of the same showing more particularly the means for effecting connection with the stump.

In carrying out my invention I provide the lever or sweep A having at its fulcrum the equalizer link bar $a$ pivoted or held upon the central one of a series of cross bolts $b$ arranged upon the front side of said lever or sweep, said central cross bolt having its ends held in eyes formed by a central transverse concavity $b^\times$ in a plate $b^{\times\times}$ coincident concavities $a^\times$ in the metal straps $a^{\times\times}$, said plate being applied to the lever and said straps being applied to said plate. The cross bolts $b$ are held at their ends in eye bolts $b'$ passed through the lever or sweep A secured by means of nuts $f$ screwed upon said eyebolts and between said nuts and lever or sweep is preferably interposed a plate $a^{\times\times\times}$. Two upper and two lower eyebolts $b'$ pass through the strap $a^{\times\times}$ and the plate $b^{\times\times}$ and secure the former to the latter and together with the other eyebolts $b'$ secure said plates to the lever or sweep A. This equalizer link bar $a$ plays in a recess $a'$ in the lever A, diverging or flaring rearward to prevent the interference of the link with the movement of the lever. The link bar $a$ has at its rear or projecting end an ordinary link or ring $c$ engaged by a chain $d$ secured to any suitable or convenient fixture, as for instance to an unextracted stump. The other cross bolts $b$ have slipped upon them, and retain in place upon the front side of the lever A, ordinary links or rings $f', f'$, for the connection therewith of the pulling chain $g$, and for the shifting or adjustment of the point of attachment of said chain according to the leverage required, or upon which side of the fulcrum of the lever it is desired to make connection with the stump pulling chain—according as to whether the lever is to be moved toward or away from the stump. The chain $g$ has at its outer end adapted to be connected to one of several link rods $h$ connected by ordinary chain links, the outer end one of which has connected to it grappling hooks $h'$ $h'$ to engage chains, looped around roots of the stump to be extracted, said connected link rods being passed over a trestle $i$, placed near the stump, when it is required to retain said link-rods, with said stump pulling chain, elevated.

The outer or hitching end of the lever or sweep A is suitably supported by a wheel $j$ carried by an axle $j'$ projecting from that end thereof.

$k$ is the slack compensating hook for the stump pulling chain, the application of which is obvious.

Having thus fully described my invention, I claim—

The stump extractor having the sweep or lever provided with a flaring recess on one side and a series of cross bolts on the other side, in combination with the fulcrum link bar pivoted to the central one of said series of cross bolts and adapted to project from, and play in said flaring recess in said lever or sweep, the other cross bolts having a series of links, arranged upon the opposite side of the lever from which the fulcrum link bar projects, and the pulling chain adapted to be connected to any one of said links, substantially as set forth.

In testimony whereof I affix my signature in presence of witnesses.

BENJAMIN MATTRESS.

Witnesses:
ERNEST SEVIER,
JAMES A. BLANE,
WILLIAM ROBINSON.